C. H. LANTZ.
CLOTH MEASURING MACHINE.
APPLICATION FILED JAN. 22, 1909.

942,084.

Patented Dec. 7, 1909.
4 SHEETS—SHEET 2.

Witnesses
W. C. Healy

Inventor
C. H. Lantz
By James J Shuly
Attorney

C. H. LANTZ.
CLOTH MEASURING MACHINE.
APPLICATION FILED JAN. 22, 1909.

942,084.

Patented Dec. 7, 1909.
4 SHEETS—SHEET 4.

Witnesses

Inventor
C. H. Lantz.
By James J Sheehy
Attorney

UNITED STATES PATENT OFFICE.

CHARLES HERBERT LANTZ, OF MANHATTAN, KANSAS.

CLOTH-MEASURING MACHINE.

942,084.  Specification of Letters Patent.  Patented Dec. 7, 1909.

Application filed January 22, 1909. Serial No. 473,693.

*To all whom it may concern:*

Be it known that I, CHARLES HERBERT LANTZ, a citizen of the United States, residing at Manhattan, in the county of Riley and State of Kansas, have invented new and useful Improvements in Cloth-Measuring Machines, of which the following is a specification.

My invention has to do with the measuring of cloth, ribbon, lace and other flexible material.

One of the objects of the invention is to provide a machine for measuring cloth and the like, embodying such a construction that the material to be measured may be expeditiously and easily placed in, passed through and removed from the machine.

Another object of the invention is the provision of a machine of the character stated embodying means adapted to be set for various lengths to be measured, and also adapted when a predetermined length has passed through the measuring mechanism to apprise the operator of the machine of the fact.

Another object is the provision in a cloth measuring or analogous machine of means adapted when a predetermined length of material to be measured has passed through the measuring means, to automatically cut off the said length of material.

Other advantageous features of the invention will be fully understood from the following description and claims, when the same are read in connection with the drawings, accompanying and forming part of this specification, in which:

Fig. 3 is an enlarged, detail view, partly in elevation and partly in section and showing a portion of the measuring mechanism hereinafter specifically referred to. Fig. 4 is a detail horizontal section showing the measuring mechanism and certain appurtenances adjacent thereto. Fig. 5 is an enlarged vertical section showing the cloth-cutting knife and also showing the wood block with which the said knife is arranged to coöperate. Fig. 6 is a detail view taken at a right angle to Fig. 5 and illustrating the manner in which the holder of the said wood block is detachably fixed in the frame of the machine.

Similar letters designate corresponding parts in all of the views of the drawings, referring to which:

Figure 13:
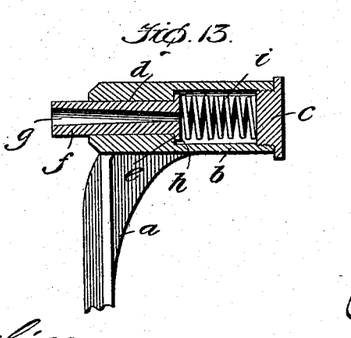
Fig. 13 is an enlarged detail section showing the means which I prefer to employ for holding the said devices for giving off and taking up the material to be measured, with a view of preventing too free turning of said devices.

A is the base of my novel machine from which rise standards $a$ located adjacent one side and the opposite ends of the base. The said standards $a$ are identical in construction, and therefore a detailed description of the one shown in Fig. 13 will suffice to impart a definite understanding of both. By reference to the said Fig. 13, it will be seen that the standard is provided at its upper end with a casing $b$, disposed transversely of the machine, and that the said casing is interiorly threaded at its outer end to receive a closure plug $c$, and is provided with an inner reduced bore $d$ and an interior shoulder or abutment $e$ at the inner end of said reduced bore. The reduced bore $d$ is designed to receive and permit turning of a holder $f$ for one of the devices or attachments for engaging the devices for giving off and taking up the material to be measured, and it will be noticed that the said holder $f$ is provided with a taper bore $g$ and is headed at its outer end, as indicated by $h$; the said head or enlargement $h$ being designed to bring up against the abutment $e$ with a view of limiting inward movement of the holder $f$ and being also designed for the engagement of one end of the spring $i$ which is interposed between it and the closure plug $c$ and has for its office to prevent too free turning of the holder and the parts connected therewith. It will also be noticed at this point that the spring $i$ permits of the holder and the device therein being moved outwardly to facilitate placing of a cardboard, a roller or the like in engagement with said device, and then operates to return the holder to the position illustrated.

Figure 1:
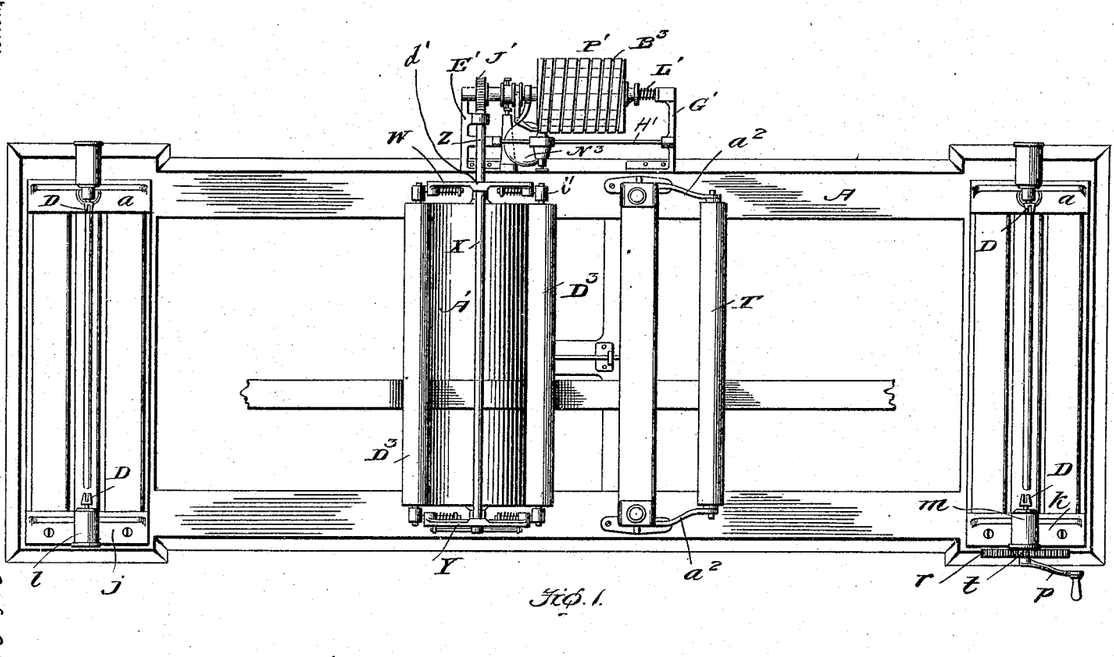
Figure 1 is a plan view of the machine constituting the best practical embodiment of my invention of which I am cognizant; the same being shown with a portion of ribbon to be measured as properly arranged relative to the measuring mechanism, but with the cardboards on and off which the ribbon is moved omitted.
Figures 2, 14:
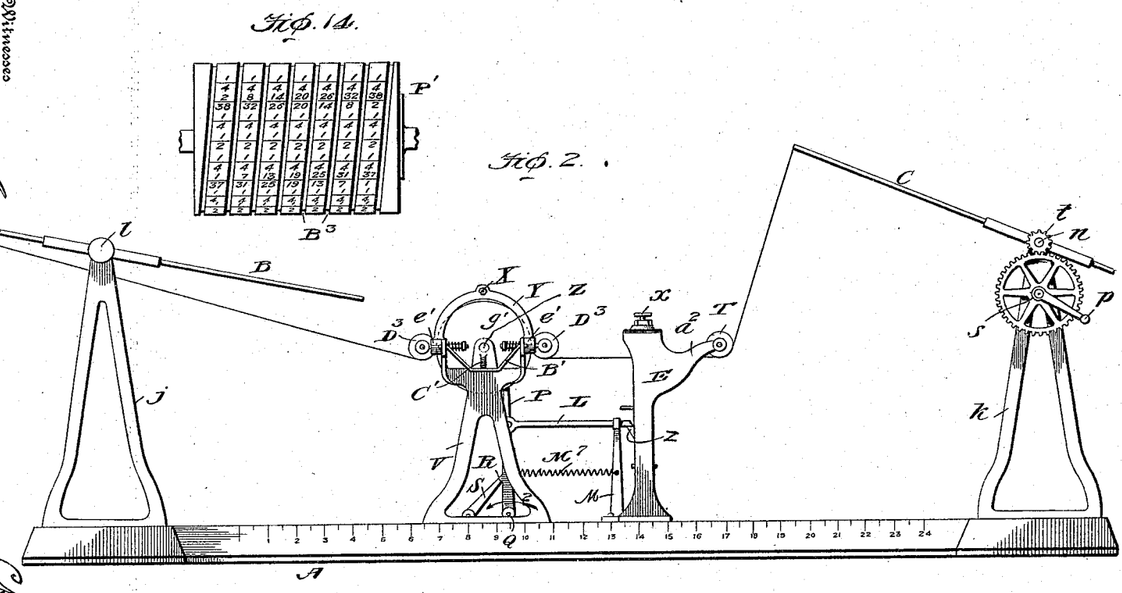
Fig. 2 is a full side elevation of the machine with the outer portions of the cardboards broken away; it being understood at this point that the arms of each cardboard reach a common distance from the center of movement thereof.
Fig. 14 is an enlarged plan view of the measuring drum *per se*, showing the double numbering of the graduations alongside the spiral groove in the perimeter of the drum.
Figure 7:
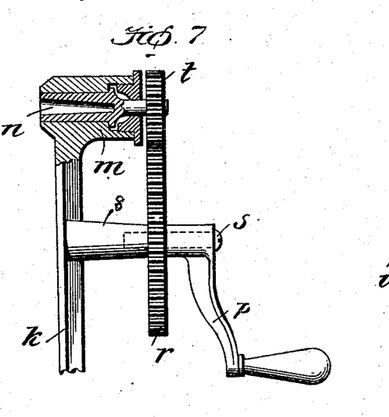
Fig. 7 is an enlarged detail view illustrating the manner in which I prefer to impart motion to the device for taking up the cloth or other flexible material that is being measured.

At the opposite side of the base A, with reference to the standards $a$, are standards $j$ and $k$; the standard $j$ being provided with a transversely disposed casing $l$, Figs. 1 and 2, which is generally similar to the casing $m$ of the standard $k$, and is provided with a holder (not shown) like that indicated by $n$ in Fig. 7. By reference to Figs. 1, 2 and 7, it will be seen that a crank $p$ is preferably employed to turn the device upon which the material that is measured is taken up; the said crank $p$ being mounted with a spur gear $r$ on a stub shaft $s$ connected with the standard $k$, and the said spur gear $r$ being intermeshed with a pinion $t$ keyed or otherwise fixed on an outwardly extended portion of the holder $n$.

Figure 10:
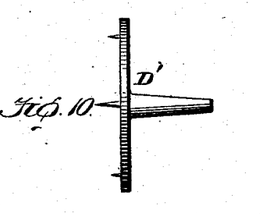
Figs. 10, 11, and 12, are different attachments for engaging the devices for giving off and taking up the flexible material to be measured.
Figure 11:
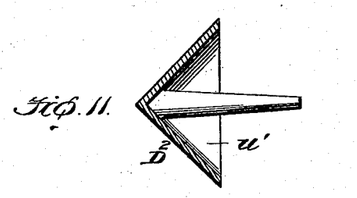
Figure 12:
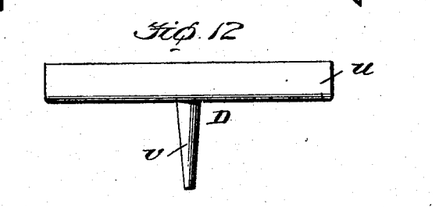

In Fig. 2 the devices for giving off and taking up the material to be measured, respectively, are represented as cardboards, and when such devices B and C are employed, attachments D, Figs. 1 and 12, will be employed to engage and hold opposite edges of the same; the said attachments D each having a kerfed T-head $u$ and a stem which latter is tapered and consequently is designed to be held by frictional contact in the taper bore of one of the four holders hereinbefore referred to. When, however, tubes or rollers (not shown) are employed for giving off and taking up the material to be measured, attachments such as the attachments D′ of Fig. 10 will be employed in lieu of the attachments D, and in those cases where the ends of the rollers are broken or damaged attachments like the attachment D² of Fig. 11 will be employed, the said attachment D² having a conical head $u'$ and being therefore adapted to extend into and properly hold the damaged end of a tubular roller.

Figures 3, 4, 5, 6:
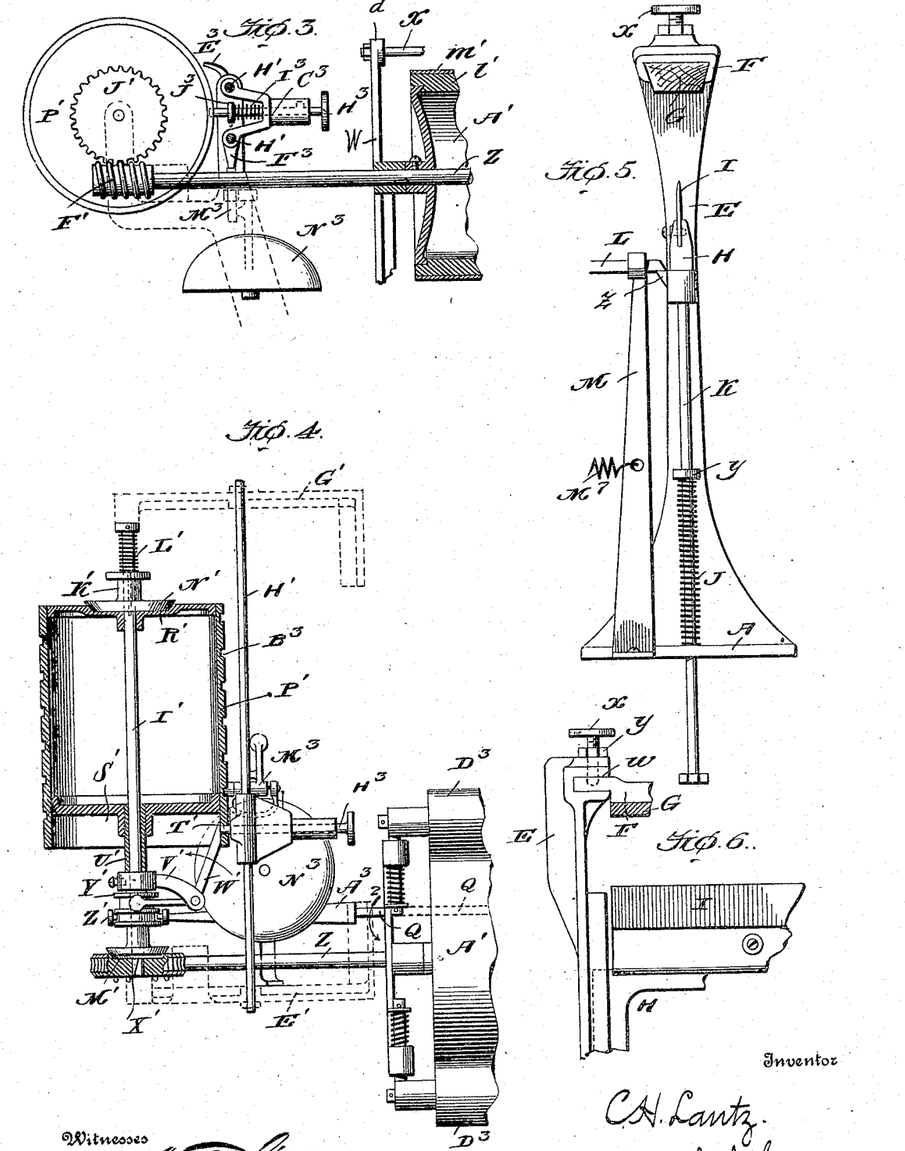

Rising from opposite sides of the base A at an intermediate point in the length of the base are standards E, one of which is shown in Fig. 6. Each of the said standards E is provided adjacent its upper end with a recess $w$, and is also provided in the upper wall of said recess with a screw $x$ on which is a jam nut $y$. The recesses $w$ in the standards E are designed to receive the reduced ends of a metallic holder F, and the screws $x$ have for their office to detachably fix the holder F in and to the standards, this in order that when occasion demands the holder F may be removed, so that the wood block G which it carries may be readily removed to give way to a fresh wood block. In this connection attention is directed to the fact that the holder F is in part of dovetail form in cross-section, and that the dovetail portion is open at its opposite ends so as to permit of an old block being displaced in the direction of its length and a fresh block being introduced to position in a similar manner. As will be observed by reference to Figs. 2, 5 and 6, the standards E serve the additional purpose of guides for the vertically movable head or frame H in which the knife I for cutting the cloth is carried. The said knife I is movable toward and from the block G and is designed to be forcibly impelled against the block by a spring J which surrounds a stem K and is interposed between an enlargement $y$ on the stem and the base A. In this connection it will be noticed that when the knife I and the head or frame H are pressed downwardly into the position shown in Fig. 5, the spring J will be compressed or put under tension, and consequently when the knife head H and the knife I are released, the spring will quickly and forcibly raise the knife against the block with the result that the cloth or analogous material resting between the knife and the block will be neatly severed. When the knife head or frame H is depressed against the action of the spring J, a beveled projection $z$ on said head or frame H will assume a position below a latch bar L, guided in a suitable support M. Then when the latch bar L is moved toward the right in Fig. 5 to a position above the projection $z$, it will operate to retain the knife head and the knife in their depressed position. The latch bar L is pivotally connected to a vertically swinging lever P, and the said lever P is fixed on a transversely disposed rock-shaft Q, Fig. 2, in order that the knife head H and the knife I may be automatically released at a predetermined time, as will be hereinafter described in detail.

From the foregoing it will be understood that the cutting means of my improvements comprises the knife I and the spring J for impelling the knife; also, that the knife is held against upward movement and the spring is held under tension by the latch bar L, and that operation of the cutting means is effected—i. e., produced or caused to be, by the release of the knife.

It is desirable in some cases to cut the cloth or other material by hand instead of automatically in the manner described, and to meet this condition I provide the lever P with a shoulder or abutment R, and I also provide a locking lever S. The latter is pivoted to the base A and is designed when it is desired to place the automatic cutting mechanism out of operation, to be thrown up into engagement with the shoulder or abutment R after the manner shown in Fig. 2. When, however, operation of the automatic cutting mechanism at a predetermined time is desired, the lever S is swung toward the left in Fig. 2 out of engagement with and away from the shoulder or abutment R.

T is a guide roller under which the cloth, ribbon, or other material to be measured is passed precedent to the passage of said material to the card C by which it is taken up. The said roller T is arranged as shown in Figs. 1 and 2, and is journaled in arms $a^2$ extending from the upper portions of the standards E.

Figure 8:
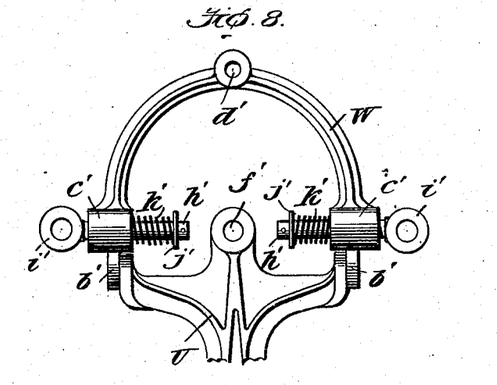
Fig. 8 is an enlarged detail elevation showing the manner in which one end of the sub-frame for carrying the measuring roller and the pressure rollers is connected in a hinged manner with the main frame at one side of the latter.
Figure 9:
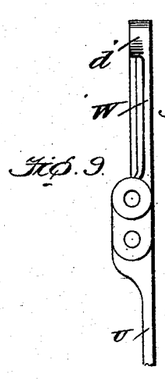
Fig. 9 is a detail elevation taken at a right angle to Fig. 8 and showing the said hinge connection.

Rising from the same side of the base A as the standards $a$ and arranged in rear of the standards E, with reference to the direction in which the material to be measured is moved, is a standard U, best shown in Figs. 8 and 9, and rising from the opposite side of the base A at a point in transverse alinement with the standard U, is a standard V, best shown in Fig. 2. To the standard U is hinged at $b'$ $b'$ a casting W which is provided at $c'$ $c'$ with journal bearings disposed in the direction of the length of the machine and is also provided at $d'$ with an aperture to receive a rod X by which the said casting W is fixedly connected with a casting Z, located at the opposite side of the machine and also provided with journals $c'$ extending in the direction of the length of the machine. The standard U is provided at $f'$ and the standard V at $g'$ with bearings for the shaft Z of the cloth-measuring roller A', and the casting W in combination with the rod X and the casting Y forms a frame which is designed to be swung in a vertical plane and on the standard U, toward and from the standard V, this in order to permit of the cloth or other material to be measured to be readily placed on the measuring roller A'. When the said frame, which I will hereinafter denominate as the sub-frame, is lowered to its working position, it is secured in such position by the bail-shaped catch B' Fig. 2, which is pivoted to the casting Y and is designed to engage the beveled keeper C' on the standard V, and in that way hold the sub-frame down in its horizontal working position. Incidental to the lowering of the sub-frame to said position, the catch B' is designed to ride over the beveled keeper C' and assume a position below said keeper, as shown in Fig. 2. It will be understood, however, that when it is desired to raise the sub-frame, the catch B' may be readily swung out of engagement with the said keeper C'.

The journal bearings $c'$ of the casting W, and the journal bearings $e'$ of the casting Y, are for the reception of the endwise movable stems $h'$ of transversely disposed bearings $i'$ in which are journaled the trunnions of pressure rollers $D^3$, and interposed between the inner ends of the bearings $c'$ and $e'$ and enlargements $j'$ on the stems $h'$ are coiled springs $k'$ which have for their office to hold the rollers $D^3$ under yielding pressure against the cloth between the same and the measuring roller A', this with a view of assuring turning of said measuring roller A' incidental to the passage thereover of the cloth *en route* between the card B and the card C.

It will be manifest from the foregoing that the fabric to be measured may be readily carried from the card B over the measuring roller A' and connected to the card C, and then the sub-frame may be lowered to and fastened in its working position over the cloth and measuring roller A' thereunder, whereupon the rollers $D^3$ will yieldingly press the cloth against the measuring roller in the manner and for the purpose before described.

The cloth-measuring roller A' may be of any construction consonant with the purpose of my invention, though I prefer to have it comprise a cylindrical portion $l'$, of wood, and covering $m'$, of rubber or other suitable friction-affording material, thereon. Said roller A' is suitably fixed to the shaft Z, and the said shaft is extended a considerable distance beyond one end of the roller, Figs. 1, 3 and 4, is journaled in a standard E' rising from the base A, and is equipped with a worm screw F'. At about the distance shown from the standard E' another standard G' rises from the base A, and between the two standards extend two longitudinal rods H' which are arranged one above the other, Fig. 3, and are designed for a purpose presently described. Also extending between the two standards E' and G' is a longitudinal shaft I'. Fixed on said shaft I', at one end thereof, is a worm wheel J', intermeshed with the worm screw F', while feathered on the other end portion of the shaft or otherwise adapted to turn with and slide on the shaft is a sleeve K' Fig. 4 between which and the standard G' is interposed a coiled spring L' having for its office to hold the sleeve under yielding pressure toward the left. The inner side of the worm wheel J' is shaped to form the female member M' of a friction clutch, and the inner end of the sleeve K' is shaped to form the male member N' of another friction clutch.

Loosely mounted on the shaft I', at the inner side of the male clutch member N', is the measuring drum P′ of my improvements. This drum P′ has one of its heads shaped to form a female friction-clutch member R′ complementary to the male member K′, and the opposite head of the drum is arranged about the proportional distance illustrated from the adjacent end thereof to form an end flange S′ in which is a radially disposed aperture T′, Fig. 4, for an important purpose hereinafter set forth. Fixed to the last named head of the measuring drum P′ is a sleeve U′, and on the sleeve U′ and adapted to turn with the same and the drum is an arm V′. Fulcrumed on the arm V′ and adapted to turn with the same about the axis of the shaft I′ is an angular lever W′, one arm of which rests over the inner end of the before-mentioned radially disposed aperture T′ for an important purpose presently explained.

At its outer end the sleeve U′ terminates in a male friction clutch member X′ complementary to the female member M′ in the inner side of the worm wheel J′, and it will be observed that because of the measuring drum P′ being held under yielding pressure between the friction-clutch member K′ and the friction-clutch member M′, the drum P′ will, under normal conditions, be caused to turn with the shaft, and yet when the shaft rotates after the drum P′ is locked against rotation in the manner hereinafter described, no damage to any of the parts will ensue. Surrounding the sleeve U′ and slidable thereon but mounted to turn therewith is a sleeve Y′ having two circumferential grooves, one for the loose reception of the outer arm of the angular lever W′, and the other for the loose reception of a fork Z′ at the upper end of a lever A³, which lever A³ is fixed on the before described transverse shaft Q. By virtue of this construction it will be manifest that with the locking lever S, Fig. 2, out of engagement with the abutment R of the lever P, movement of the angular lever W′ in the direction indicated by arrow, Fig. 4, will be attended by outward movement of the sleeve Y′, and movement of the lever A³ and shaft Q in the direction indicated by arrow No. 2 in Fig. 4, and also in Fig. 2, with the result that the latch bar L will be drawn out of engagement with the projection $z$ on the knife head H, thereby permitting the spring J, Fig. 5, to impel the knife I upwardly against the block G.

As shown in Figs. 1 and 4, the measuring drum P′ is provided in its perimeter with a spiral groove B³ which extends from a point adjacent one end of the drum to a point near the opposite end of the drum, where it terminates in the before-mentioned radially disposed aperture T′.

Arranged on the rods H′ and movable in the direction of the length of the machine is a carriage C³ which is provided with a pointer E³ and a depending arm F³, and carries a pin H³ which is held under yielding pressure against the drum by a coiled spring I³ interposed between the carriage and an enlargement J³ on the pin. The inner end of the pin H³ extends into the spiral groove B³ and bears against the bottom of said groove, and from this it follows that when the drum P′ is rotated by the passage of the material to be measured over the roller A′, the carriage C³ will be moved longitudinally of the machine on the rods H′. It will also be understood that when the pin H³ becomes coincident with the aperture T′ in the drum, the spring I³, by forcing the pin against the inner arm of the lever W′ will rock the said lever W′ in the manner and for the purpose before set forth.

By reference to Fig. 14, it will be seen that alongside the groove B³ are marked the yards and the fractions thereof. It will also be observed that there are two sets of figures, one above and one below the yard line, and that the figures above the lines start with 1 at the left hand end of the drum, and the figures below the line start with 1 at the right hand end of the drum; the upper figures being used when the material is to be not only measured, but automatically cut off, and the lower figures being used when the machine is employed for invoicing, at which latter time the knife mechanism is prevented from operating by the locking lever S resting in engagement with the abutment R of the lever P.

With a view of apprising the party operating the machine that operation of the automatic cutting off mechanism is imminent, I prefer to employ the lever M³, Fig. 4, which is designed when struck by the depending projection F³ of the carriage C³, to strike a gong N³. I would also have it understood that when it is not desired to employ the automatic cutting off mechanism, the ringing of the bell may be depended on to apprise the operator when almost all of the length of material desired has been taken up on the device C, and then when the pin H³ reaches the left hand end of the groove B³, the operator may cut the material by hand.

In the practical operation of my novel machine, a card bearing the material to be measured is placed in the holders D at the left hand end of the machine, and the free end of the material is carried over the measuring-roller A′ and under the guide roller T, and is connected to the card in the holders D at the right hand end of the machine. The sub-frame carrying the pressure rollers D³ is then lowered to and fastened in its horizontal position. With this done the pin H³ is drawn outwardly in the carriage C³ and is turned to lock it or is detachably fastened against inward movement in any other approved manner, and, at the same time, the clutch member N' is pressed toward the right and is held out of engagement with the drum P' so as to leave the latter free to turn on the shaft I'. The drum is then turned until the number corresponding to the number of yards that it is desired to measure appears, after which the carriage C³ is moved to the right until the pointer E³ on the carriage is opposite and adjacent the said number, whereupon the pin H³ is turned to release the same and enable the spring I³ to force the pin into the groove B³, and the clutch member N' is released to enable the spring L' to press the same against the drum. Then when the material to be measured is drawn off the card B and on the card C, the drum P will be rotated until the pin H³ is forced through the aperture T', when the rotation of the drum will be stopped and the material will be cut by the described automatic operation of the knife I. In order that the pin H³ may, when retracted, be locked against forward movement under the action of the spring I³, I provide the pin, by preference, with a lateral projection, shown by dotted lines in Fig. 3, and then when the pin is drawn through a keyhole opening (not shown) in the inner end of the carriage C³ and turned to oppose the said lateral projection to the inner end of the carriage, it will be manifest that the pin will be locked out of the groove B³ in the drum P'. Again, when the pin A³ is turned to register its lateral projection with the keyhole, the projection will pass through the keyhole and then the spring I³ will operate to hold the pin under yielding pressure in the groove B³ of the drum.

As before stated, the construction herein illustrated and described constitutes the best practical embodiment of my invention of which I am aware, but I would have it understood that I do not wish to be restricted to the means herein disclosed for attaining the desired ends stated, inasmuch as various changes or modifications may be made without departing from the spirit of my invention as defined in my appended claims.

When deemed necessary, a coiled spring M⁷, Fig. 2, may be connected with the lever which rises from the rock-shaft Q, this with a view of returning the latch bar to and normally holding the same in position to rest over the projection on the knife head or frame.

Having described my invention, what I claim and desire to secure by Letters-Patent, is:

1. In a machine for measuring cloth and like material, the combination of a shaft adapted to be rotated by the passage of material through the machine, a drum frictionally held on the shaft and having a spiral groove and an aperture in communication therewith, and a carriage having a pin adapted to move in the groove of the drum and into the aperture thereof.

2. In a machine for measuring cloth and like material, the combination of a measuring drum adapted to be rotated by the passage of material through the machine, a spring-impelled knife, means for holding the knife out of action a carriage movable by the rotation of the drum, and means operated by the carriage for releasing the knife at the completion of a predetermined traverse of the carriage.

3. In a machine for measuring cloth and like material, the combination of a measuring drum adapted to be rotated by the passage of material through the machine, means for cutting the material, a device movable by the rotation of the drum, means for holding the cutting means against movement, and means actuable by the movable device upon the completion of a predetermined movement thereof for releasing the cutting means.

4. In a machine for measuring cloth and like material, the combination of a measuring drum adapted to be rotated by the passage of material through the machine, a spring-impelled knife, means for holding the knife out of action, a device movable by the rotation of the drum, and means operated by said device for releasing the knife at the completion of a predetermined movement of said device.

5. In a machine for measuring cloth and like material, the combination of a shaft adapted to be rotated by the passage of material through the machine, a drum frictionally held on the shaft and having a spiral groove and an aperture in communication therewith, means for cutting the material, a carriage having a pin adapted to move in the groove of the drum and into the aperture thereof, and means actuable by the said pin for effecting operation of the cutting means upon the completion of a predetermined traverse of the carriage.

6. In a machine for measuring cloth and like material, the combination of a measuring drum adapted to be rotated by the passage of material through the machine, means for cutting the material, a device movable by the rotation of the drum, a lever rotatable with the drum and movable independently of the drum and by the said device, and means actuable by the said lever for effecting operation of the cutting means upon the completion of a predetermined movement of said movable device.

7. In a machine for measuring cloth and like material, the combination of a measuring drum adapted to be rotated by the passage of material through the machine, a spring-impelled knife, a device movable by the rotation of the drum, a lever rotatable with and movable independently of the drum, and actuable by said device and means normally holding the spring-impelled knife against movement and actuable by the said lever to release the knife at the completion of a predetermined movement of said movable device.

8. In a machine for measuring cloth and like material, the combination of a measuring drum adapted to be rotated by the passage of material through the machine and having a spiral groove and an aperture in communication therewith, a carriage movable by the rotation of the drum and carrying a pin movable in the spiral groove and into the aperture of the drum, means for cutting the material, a lever rotatable with and movable independently of the drum and by the said pin, and means actuable by the said lever for effecting operation of the cutting means at the completion of a predetermined traverse of the carriage.

9. In a machine for measuring cloth and like material, the combination of a shaft adapted to be rotated by the passage of material through the machine, a drum frictionally held on the shaft and having a spiral groove and an aperture in communication therewith, a carriage movable by the rotation of the drum and having a pin movable in the spiral groove and into the aperture of the drum, means for cutting the material, a lever rotatable with and movable independently of the drum and by the said pin, and means actuable by the said lever for effecting operation of the cutting means at the completion of a predetermined traverse of the carriage.

10. In a machine for measuring cloth and like material, the combination of a spring-impelled knife, a shaft adapted to be rotated by the passage of material through the machine, a drum frictionally held on the shaft and having a spiral groove and an aperture in communication therewith, a carriage movable by the rotation of the drum and having a pin movable in the spiral groove and into the aperture of the drum, a lever rotatable with and movable independently of the drum and by the said pin, and means normally holding the spring-impelled knife against movement and actuable by the lever to release the knife at the completion of a predetermined traverse of the carriage.

11. In a machine for measuring cloth and like material, the combination of a measuring drum adapted to be rotated by the passage of material through the machine, means for cutting the material, means movable by the rotation of the drum and comprising a carriage, a pin movable in the carriage and having a handle at its rear end, whereby it may be retracted, and a spring for impelling the pin forwardly, and means actuable by the said pin for effecting operation of the cutting means at the completion of a predetermined traverse of the carriage.

12. In a machine for measuring cloth and like material, the combination of a shaft adapted to be rotated by the passage of material through the machine, a drum frictionally held on the shaft and having a spiral groove and an aperture in communication therewith, and means movable by the rotation of the drum and comprising a carriage, a pin movable in the carriage and having a handle at its rear end and also having its forward end movable in the groove and into the aperture of the drum, and a spring for impelling the pin forwardly.

13. In a machine for measuring cloth and like material, the combination of a shaft adapted to be rotated by the passage of material through the machine, means for cutting the material, a drum frictionally held on the shaft and having a spiral groove and an aperture in communication therewith, means movable by the rotation of the drum and comprising a carriage, a pin movable in the carriage and having a handle at its rear end and also having its forward end movable in the groove and into the aperture of the drum, and a spring for impelling the pin forwardly, and means actuable by the movement of the pin in the aperture of the drum for effecting operation of the cutting means.

14. In a machine for measuring cloth and like material, the combination of a spring-impelled knife, a measuring drum adapted to be rotated by the passage of material through the machine and having a spiral groove in its perimeter and also having an aperture in communication with the groove, a carriage having a pin movable in the groove of the drum and into the aperture thereof, a latch for normally holding the knife against movement, a lever rotatable with the drum and movable independently of the same and by the said pin, and means intermediate the lever and the latch for withdrawing the latter from the spring-impelled knife when the lever is moved.

15. In a machine for measuring cloth and like material, the combination of a spring-impelled knife, a measuring drum adapted to be rotated by the passage of material through the machine and having a spiral groove in its perimeter and also having an aperture in communication with said groove, a carriage having a pin movable in the groove of the drum and into the aperture thereof, a latch for normally holding the knife against movement a lever rotatable with the drum and movable independently of the same and by the said pin, an endwise movable device movable by said lever, a rock-shaft, a lever fixed thereon and connected with the latch and having a shoulder, a second lever fixed on the rock-shaft and movable by the endwise movable device, and a locking lever movable into and out of engagement with the shoulder on the first named lever of the rock-shaft.

16. In a machine for measuring cloth and like material, the combination of a spring-impelled knife, a shaft adapted to be rotated by the passage of material through the machine, a measuring drum frictionally mounted on the shaft, whereby the shaft is adapted to turn in and independently of the drum; said drum having a spiral groove in its perimeter and also having an aperture in communication with said groove, a carriage having a pin movable in the groove of the drum and into the aperture thereof, a latch for normally holding the knife against movement a lever rotatable with the drum and movable independently of the same and by the said pin, an endwise movable device movable by said lever, a rock-shaft, a lever fixed thereon and connected with the latch and having a shoulder, a second lever fixed on the rock-shaft and movable by the endwise movable device, and a locking lever movable into and out of engagement with the shoulder on the first named lever of the rock-shaft.

17. In a cloth measuring machine, the combination of standards, a roller journaled therein and adapted to be rotated by passage of material to be measured, a sub-frame hinged at one end to one of said standards, means for detachably connecting the other end of the sub-frame to the other standard, pressure rollers carried by the sub-frame and disposed at opposite sides of the first named roller and movable toward and from the same, and means for yieldingly pressing the pressure rollers toward the first named roller.

18. In a machine for measuring cloth and like material, the combination of a spring-impelled knife, a measuring drum, a roller adapted to be rotated by the passage of material through the machine, a connection intermediate said roller and drum for rotating the latter by the former, a carriage movable by the rotation of the drum, and means for releasing the knife at the completion of a predetermined traverse of the carriage.

19. In a machine for measuring cloth and like material, the combination of a spring-impelled knife, a measuring drum having a spiral groove in its perimeter and also having an aperture, a carriage having a spring-actuated pin movable in the groove and through the aperture of the drum, a lever rotatable with the drum and movable by said pin, and means movable by said lever for releasing the knife.

20. In a machine for measuring cloth and like material, the combination of a spring-impelled knife, a measuring drum having a spiral groove in its perimeter and also having an aperture, a carriage having a spring-actuated pin movable in the groove and through the aperture of the drum, a lever rotatable with the drum and movable by said pin, a latch for holding the knife against movement, an endwise-movable device engaged and adapted to be moved by the lever that is movable by the pin, a rock-shaft, a lever fixed thereon and connected with the latch, and a second lever fixed on the rock-shaft and movable by the endwise-movable device.

21. In a machine for the purpose described, the combination of a knife, means for impelling the same, standards having recesses, a bar having ends detachably secured in the recesses of the standards and also having a holder, of dovetail form in cross-section, open at its ends, and a block of corresponding form in cross-section removably arranged in said holder.

22. In a machine for the purpose described, the combination of standards having guide-ways and also having recesses, a knife, a frame carrying the knife and guided in the standards, a spring for moving said frame in one direction, a bar having ends detachably secured in the recesses of the standards and also having a holder, of dovetail form in cross-section, open at its ends, and a block of corresponding form in cross-section removably arranged in said holder.

23. In a machine for measuring cloth or like material, the combination of a shaft adapted to be rotated by the passage of material through the machine, a drum frictionally held on the shaft and having a spiral groove and an aperture in communication therewith, a carriage having a pin adapted to move in the groove of the drum and into the aperture thereof, and means for sounding an alarm when the entry of the pin into the aperture is imminent.

24. In a machine for measuring cloth and like material, the combination of standards, a roller journaled therein and adapted to be rotated by passage of material to be measured, a sub-frame hinged at one end to one of said standards, means for detachably connecting the other end of the sub-frame to the other standard, revoluble means for paying off material, disposed at one side of the roller, revoluble means disposed at the opposite side of the roller and adapted to take up material, pressure rollers carried by the sub-frame and disposed at opposite sides of the first named roller and movable toward and from the same, means for yieldingly pressing the pressure rollers toward the first named roller, a shaft connected with and adapted to derive motion from the first named roller, a measuring drum frictionally held on said shaft, whereby the shaft is adapted to rotate independently of the drum; said drum having a spiral groove and an aperture in communication therewith, and a carriage having a pin movable in the groove of the drum and into the aperture thereof.

25. In a machine for measuring cloth and like material, the combination of a roller, rotatable by the passage of material to be measured, a suitably supported shaft, a driving connection intermediate the roller and said shaft, a friction clutch member fixed on the shaft, a drum loosely mounted on the shaft and having a friction clutch member at one end opposed to the first-named friction clutch member, and a friction clutch member at its opposite end, and also having a spiral, graduated groove at its perimeter, a friction clutch member opposed to the last named member of the drum and rotatable with and slidable on the shaft, a spring backing said friction clutch member, a carriage movable alongside the drum, and a spring-pressed pin on the carriage, extending into the groove of the drum.

26. In a cloth measuring machine, the combination of standards, a roller journaled therein and adapted to be rotated by passage of material to be measured, a sub-frame hinged at one end to one of said standards, means for detachably connecting the other end of the sub-frame to the other standard, journal bearings carried at the ends of the sub-frame and movable toward and from the perimeter of the roller, springs for moving said bearings toward the roller, and pressure-rollers journaled in said bearings and adapted to hold material under yielding pressure against the first-named roller.

27. In a machine for measuring cloth and like material, the combination of standards, a roller journaled therein and adapted to be rotated by passage of material to be measured, a sub-frame hinged at one end to one of said standards, means for detachably connecting the other end of the sub-frame to the other standard, pressure rollers carried by the said frame and disposed at opposite sides of the first named roller and movable toward and from the same, means for yieldingly pressing said rollers inwardly, revoluble means for paying off material, disposed at one side of the roller, revoluble means disposed at the opposite side of the roller and adapted to take up material, a shaft connected with and adapted to derive motion from the first named roller, a measuring drum frictionally held on said shaft, whereby the shaft is adapted to rotate independently of the drum; said drum having a spiral groove and an aperture in communication therewith, a carriage having a pin movable in the groove of the drum and into the aperture thereof, means for cutting the material, and means movable by the movement of the pin into the aperture for effecting operation of the cutting means.

In testimony whereof I have hereunto set my hand in presence of two subscribing witnesses.

CHARLES HERBERT LANTZ.

Witnesses:
W. N. SLOCUM,
C. G. DAVIS.